United States Patent [19]

Murakoshi

[11] 3,792,440

[45] Feb. 12, 1974

[54] COORDINATE INDICATION DEVICE ON MICROFILM

[75] Inventor: Makoto Murakoshi, Asaka, Japan

[73] Assignee: Fuji Photo Film Co., Ltd., Kanagawa, Japan

[22] Filed: Nov. 4, 1971

[21] Appl. No.: 195,723

[30] Foreign Application Priority Data

Nov. 4, 1970 Japan ................................ 45/96481

[52] U.S. Cl. ........... 340/172.5, 235/92 EV, 353/25, 353/27

[51] Int. Cl. ............................................ G03b 23/08

[58] Field of Search... 340/172.5, 173 LM, 324 AD; 353/25, 26, 27; 318/603; 235/92 EV

[56] References Cited

UNITED STATES PATENTS

| | | | |
|---|---|---|---|
| 3,017,611 | 1/1962 | Stemme | 340/172.5 |
| 3,289,172 | 11/1966 | Towle | 340/172.5 |
| 3,585,597 | 6/1971 | Holmerud | 340/172.5 |
| 3,325,786 | 6/1967 | Shashoua et al. | 340/172.5 |
| 3,612,676 | 10/1971 | Ooba et al. | 353/27 |

*Primary Examiner*—Gareth D. Shaw
*Attorney, Agent, or Firm*—Sughrue, Rothwell, Mion, Zinn & Macpeak

[57] ABSTRACT

A microfilm includes plural frames arranged in a two dimensional array, in which information is recorded on each frame. Clock pulses are utilized for representing the consecutive numbers which indicate the position of frames. An X counter counts the clock pulses to provide the X coordinate of the coordinate corresponding to the position of the desired frame. A Y counter counts the carry signals of the X counter to provide the Y coordinate. The X counter may be a reversible counter. Further, when the information is recorded on plural sheets of microfilm, i.e., with three dimensional extension, a Z counter counts the carry signals of the Y counter to indicate the sheet number of the microfilm. Thus, the coordinates of the desired frame are indicated with the outputs of the above counters.

2 Claims, 7 Drawing Figures

COORDINATE INDICATION DEVICE ON MICROFILM

BACKGROUND OF THE INVENTION

1. Field of the Invention

The present invention relates to a coordinate indication device for microfilm, i.e., a device for searching for one of the frames on a microfilm. Particularly the present invention relates to a frame searching device which indicates the coordinates of one of a plurality of frames arranged in two dimensions on a microfilm sheet in a microfilm projector or the like.

2. Description of the Prior Art

Heretofore, in case of frames arranged in multi-dimensions, a coordinate indication device to select the location of a frame has produced multi-dimensional coordinate signals. Accordingly, it has been necessary, for example in case of two dimensional coordinates, to store two dimensional coordinate signals in a memory and to search the coordinates from a keyword, i.e., to search the coordinates of the location of a frame including information corresponding to the keyword. In addition, the input keyword has had to correspond to the information for searching the frame, i.e., the index thereof. Therefore, it has been necessary to store the frame number and the index in a memory.

However, in case of a microfilm the frames of which are consecutively numbered, as the pages of a book, the frames may be considered to be the pages, i.e., the numbers of the frames may be unnecessary. And, it may be possible to search a page with only a keyword. For this purpose, a keyword may be made to correspond to an index, or, in the case of plural words, are arranged on a page according to a certain rule (i.e., in alphabetical order), a word on the page (e.g., the first or the last word therein) may be used as the index and compared with an input keyword, as to alphabetical order, so as to search the page including the keyword.

Thus, the information to be searched may serve as a keyword, and the keyword will be compared with an index in a memory of a memory device so as to search out the desired frame.

As described above, in the case of a microfilm in which a frame includes a page, it will be unnecessary to record page information in a memory because the frame number corresponds to the page number. Furthermore, if a frame, i.e., a page, is affixed with a clock signal or a command signal as an index corresponding to the page, counting the signal may make it possible to know the frame number, so that a clock signal may be substituted for the frame number and the frame number may be omitted.

In this case, if frames are arranged in a dimension as in a roll film, the output of a conventional counter, counting the clock signals, will be the coordinate signals directly. Therefore, the desired frame on the film may be shifted to the predetermined position so as to project the desired page onto a screen with magnification by means of a mechanical shifting device, e.g., by driving a pulse motor, a ratchet mechanism, or a servo motor through a D-A converter. However, in the case of a microfiche in which frames are arranged in two dimensions, or further, in the case of three dimensional search to select a frame from among plural microfiches, it will be impossible to use a conventional counter device in the usual manner.

SUMMARY OF THE INVENTION

It is an object of the present invention to provide a simple searching means for a memory in which information is recorded in two dimensions, as a microfiche. A further object of the present invention is to provide a simple searching means for information recorded in three, or more than four, as the case may be, dimensions, i.e., a simple three dimensional searching means. A still further object of the present invention is to provide a coordinate indication device to serve for decreasing the amount of coordinate information to be recorded in a memory.

According to the present invention, plural counters are utilized, and simple consecutive frame numbers counted thereby, i.e., clock pulses, are transformed into two or three, or more than four as the case may be, dimensional coordinate signals so as to search the desired frame.

In the coordinate indication device of the present invention, clock pulses are recorded as dimensional information of a position in a memory, and counted. The pulses are transformed into multi-dimensional coordinate signals, by using plural counters.

The coordinate indication device according to the present invention, both as to its construction and its mode of operation, together with additional features and advantages thereof, will be best understood by review of the following detailed description of the invention with reference to the accompanying drawings.

DESCRIPTION OF THE PREFERRED EMBODIMENT

Figure 2:
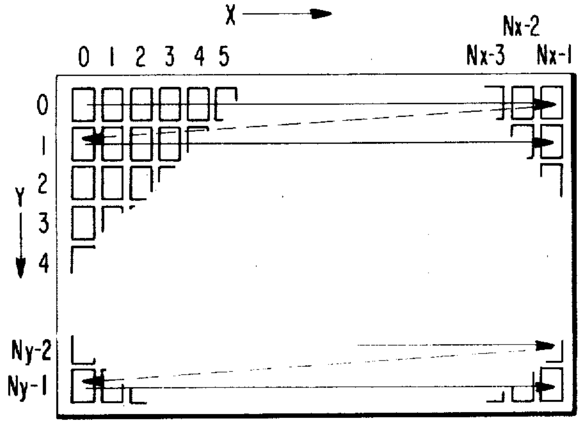
FIGS. 2 and 3 are top plan views of a microfilm, wherein two directions of frame shifting for searching are shown.
Figure 3:
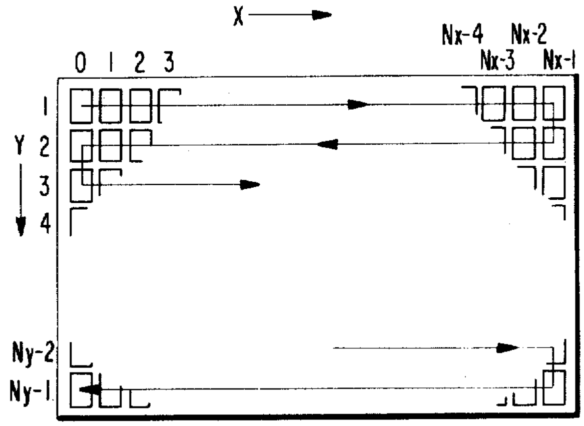

Assuming the frames of a microfilm are arranged in two dimensions, with Nx frames in the X direction and Ny frames in the Y direction as shown in FIGS. 2 and 3, the frames may be given with frame numbers from the upper row to the lower row and from left to right as shown in FIG. 2, as if writing sentences horizontally, or from the upper row to the lower row and inversely row by row from side to side as shown in FIG. 3.

Figure 1:
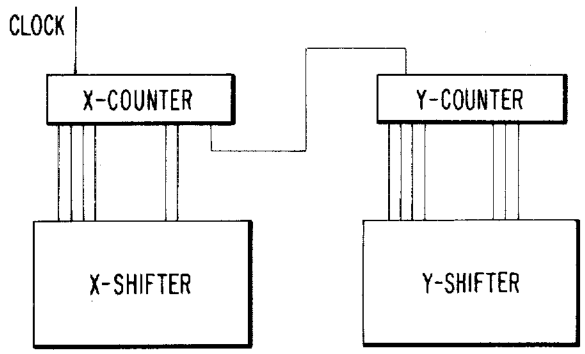
FIG. 1 is a block diagram illustrating the basic construction of the coordinate indication device for a microfilm according to the present invention.

Here, an X counter of Nx-number system and a Y counter of Ny-number system are utilized for shifting the film in the X direction and in the Y direction, respectively, as shown in FIG. 1. The Y counter is made to count the carry signals of the X counter of Nx-number system. Thus, the number of clock pulses, which designates the consecutive number of Nx-number system, are divided between and counted by the X and Y counters, so that the location of frames is transformed into the X-Y coordinates.

That is, assuming that the coordinates (0,1) are at first indicated, a clock pulse supplied to the X counter makes the X coordinate shift frame by frame from left to right, to the last frame on the right side, and then, the next clock pulse brings the X counter back to the "0" state and simultaneously the Y counter counts the carry signal from the X counter to shift the Y coordinate down by as much as a frame. Thus, in accordance with supplied clock pulses, the coordinates of the position of the frame is obtained including the page corresponding to the number of the clock pulses. According to this indication, the film is shifted to enable the coincidence of the desired frame with the axis of an optical system for projection and to enable the observation of the desired frame.

If reversible counters are utilized, the couunters may be shifted reversibly, that conveniently enables one to observe the previous pages. In addition, in the case of observing the frames sequentially, it will be desirable to lessen the amount of frame shifting, so that the frame shifting shown in FIG. 3 will be more efficient. In order to accomplish this, the logic circuit shown in FIG. 4 may be utilized.

Figure 4:
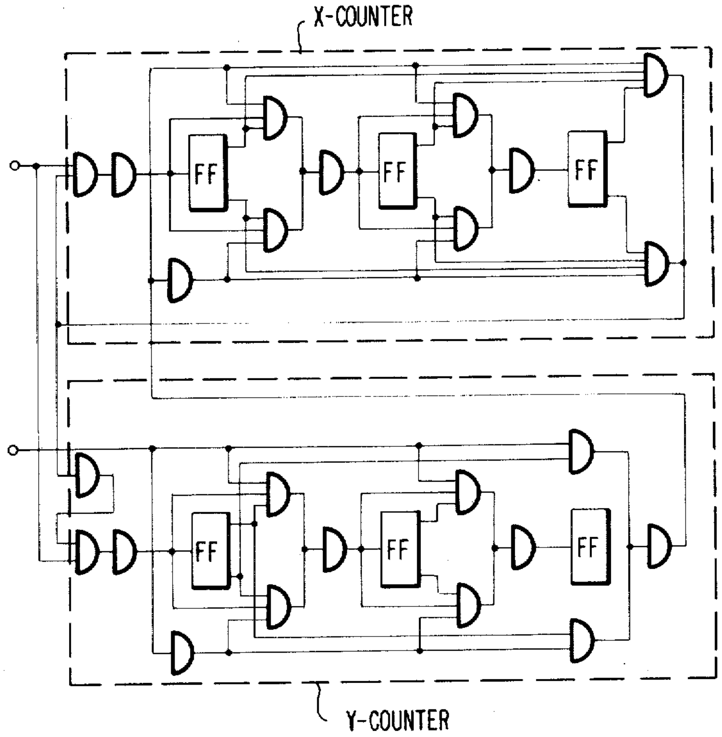
FIG. 4 is a logic circuit to enable the frame shifting shown in FIG. 3.

In the logic circuit in FIG. 4, the X counter and the Y counter with three bits of binary number are connected such that the carry signals of the X counter are supplied to the Y counter, and the X counter is made to reverse the direction of counting. The direction of the count is dependent upon whether the least significant digit of the number counted by the Y counter is even or odd, i.e., it is shifted to the right when the digit is even or "0" and to the left when odd or "1". If the logic circuit searches for a frame on a microfiche including eight frames along the X direction, the microfiche is shifted in the manner shown in FIG. 3. The circuit in FIG. 4 will be easily understood to those skilled in the art, therefore, a detailed explanation is omitted thereof.

The device described above is effective when all of the desired frames are stored on a microfiche, but ineffective when they are stored on a plurlaity of microfiches. Therefore, a Z counter may be utilized for indicating the sheet number of the microfiche, to which the carry signals from the Y counter will be supplied.

The following is a practical example of the above-described coordinate indication device.

Figure 5:
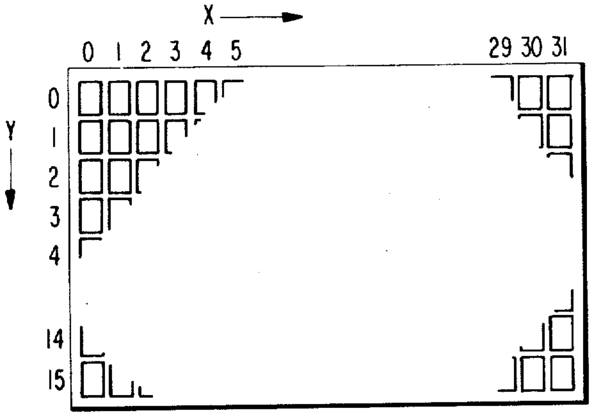
FIG. 5 is a top plan view showing the format of the microfilm for an embodiment of the present invention.

"New Kenkyusha's Japanese-English Dictionary" was recorded in five sheets of microfiches. It had 2,132 pages and about 14,000 words. The format of the microfiche used in the practice is shown in FIG. 5. Using a super microfiche system with a 1/100 reduction rate, the dictionary was recorded in 5 microfiches of 4 inches × 6 inches. A frame, in which one page was photographed, was projected onto a screen with 100 times magnification, to the size of 210 mm × 297 mm (so-called A4-size). A frame of the microfiche is 2.1 mm × 3.0 mm in size and the frame space is 3.1 mm × 4.0 mm, providing the space of 1 mm between frames. Laterally (along the X direction) 32 frames are arranged with the length of 32 × 3.1 = 99 mm, and longitudinally (along the Y direction) 16 frames are arranged with the length of 16 × 4.0 = 64 mm. All of the pages were stored on five sheets of the microfiche, the sheet number of which was counted as in the Z direction. The whole number of the frames is 32 × 16 × 5 = 2,560, and all of the pages in the dictionary were stored on the 5 microfiche.

Figures 6, 7:
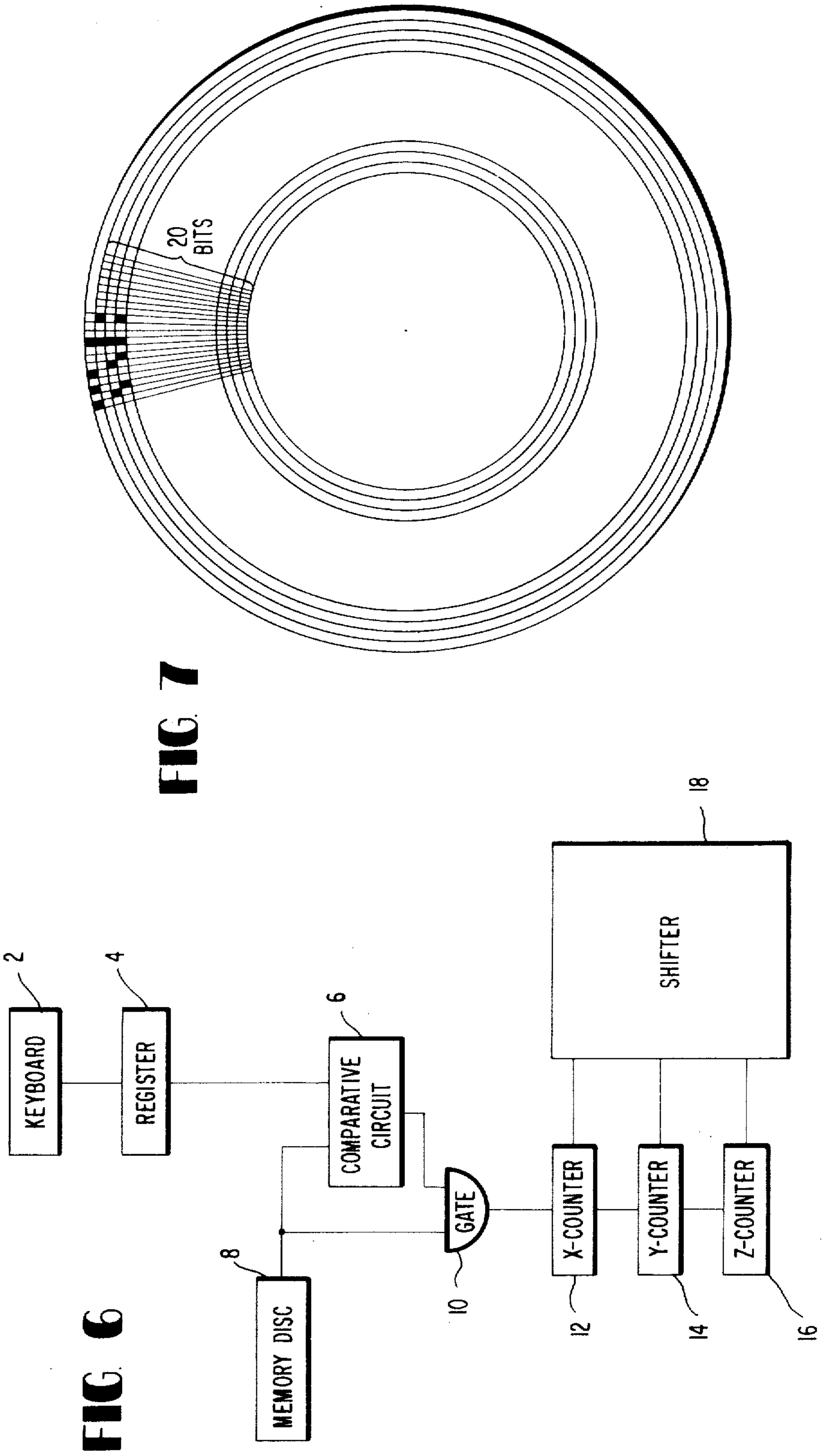
FIG. 6 is a block diagram illustrating the logic circuit system for searching the desired frame.
FIG. 7 is a top plan view of the film disc memory in which the information necessary for searching is recorded.

The logic circuit arrangement for searching in the microfiches is shown in FIG. 6.

In FIG. 7 there is shown a disc memory, which is a disc film wherein there are photographically stored clock signals in the radial direction and index signals corresponding to all of the 2,132 pages in the circular direction, which index signal consists of 4 alphabetical letters with 20 bits, given 5 bits per 1 letter. These signals are read out by a photoelectric cell and supplied to the logic circuit.

On the other hand, 4 letters, which are the letters arranged from the initial letter to the fourth letter in a word to be searched, are supplied to the logic circuit shown in FIG. 6 from keyboard 2 and stored in register 4. A comparator circuit 6 compares the letter signals and the index signals from the disc memory 8, sequentially from the first page to the last page. The comparison is synchronized with the clock signals, and generates a stop signal at the desired point. The stop signal serves to stop the operation of the counters 12, 14 and 16, which have counted the clock pulses through the gate circuit 10 consecutively from the first page. Typically, the X counter counts to 32, the Y counter counts to 16 and the Z counter counts to 5. The outputs of the counters are coordinates, and are transformed into the signals suitable for driving the shifting mechanism 18 to search out the desired frame.

Thus, the disc memory may include only the clock signals in addition to the index signals, so that only 1 bit is required for storing the coordinate information. The coordinate information is necessary for all of the counters. If the coordinate information of a frame is directly stored as it is, 12 bits will be needed, that is, 5 bits for the X direction, 4 bits for Y, and 3 bits for Z.

In addition, if an external control signal is supplied to the counters at another point, it will be possible to shift a frame forwards or backwards for the previous page or the next page.

Although an optical memory is utilized as the memory in the above description, it will be apparent to those skilled in the art that all known memories, such as magnetic tape or magnetic core, can be utilized therefor. Furthermore, although a mechanical shifting device is considered as the shifting mechanism, it will be also apparent that a CRT device or another deflector can be utilized therefor.

While the invention has been particularly shown and described with reference to the preferred embodiment thereof, it will be understood by those skilled in the art that various changes in form and details may be made therein without departing from the spirit and scope of the invention.

I claim:

1. A coordinate indication system for locating the position of a particular frame on a microfilm for use with microfilm projecting equipment which projects microfilm having frames thereon arranged in at least two dimensions, said system comprising:

a. clock signal generator means for generating clock pulses representing consecutive numbers indicative of the position of said particular frame of said microfilm;

b. reversible X counter means, coupled to said clock signal generator means, for counting the number of pulses from said clock signal generator means, and for generating an X carry signal when said counter means counts one pulse more than its capacity, said X counter having a capacity equal to the number of frames of said microfilm which are positioned in one of said at least two dimensions;

c. Y counter means, coupled to said X counter means, for receiving and counting each X carry signal, said X counter means counting forwards or backwards in accordance with whether the least significant digit of the number in said Y counter means is even or odd;

d. indication means for determining the count in said X and Y counter means after said clock signal generator means has ceased generating pulses, said indication means thereby producing an indication of the X and Y coordinates of said particular frame of said microfilm.

2. A coordinate indication system as set forth in claim 1 wherein said Y counter means has a capacity equal to the number of frames of said microfilm which are positioned in a second dimension of said at least two dimensions and said Y counter means generates a Y carry signal when said Y counter means counts one pulse more than its capacity, said system further comprising Z counter means, coupled to said Y counter means, for receiving and counting said Y carry signal, whereby the count in said Z counter represents the position of said particular frame in a third dimension.

* * * * *